(12) United States Patent
Aoyama

(10) Patent No.: US 8,537,243 B2
(45) Date of Patent: Sep. 17, 2013

(54) DISPLAY CONTROL APPARATUS

(75) Inventor: Keisuke Aoyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 942 days.

(21) Appl. No.: 12/244,508

(22) Filed: Oct. 2, 2008

(65) Prior Publication Data

US 2009/0021584 A1 Jan. 22, 2009

Related U.S. Application Data

(62) Division of application No. 10/785,857, filed on Feb. 24, 2004, now Pat. No. 7,463,288.

(30) Foreign Application Priority Data

Feb. 27, 2003 (JP) .................................. 2003-051782

(51) Int. Cl.
*H04N 5/76* (2006.01)
(52) U.S. Cl.
USPC .................. 348/231.1; 348/231.2; 348/231.3; 348/231.4; 348/231.5; 348/231.6
(58) Field of Classification Search
USPC ............................. 348/231.1–231.6; 396/222
See application file for complete search history.

(56) References Cited

U.S. PATENT DOCUMENTS

| | | | |
|---|---|---|---|
| 5,481,303 A | 1/1996 | Uehara | |
| 5,905,528 A | 5/1999 | Kodama | |
| 6,239,837 B1 | 5/2001 | Yamada et al. | |
| 6,469,738 B1 * | 10/2002 | Hayashi | 348/231.99 |
| 6,680,795 B2 | 1/2004 | Chezar et al. | |
| 6,862,106 B1 | 3/2005 | Matsushima | |
| 6,943,833 B1 | 9/2005 | Kuniba et al. | |
| 7,042,504 B1 * | 5/2006 | Toyofuku et al. | 348/231.1 |
| 7,046,275 B1 * | 5/2006 | Yamada et al. | 348/220.1 |
| 2001/0000969 A1 | 5/2001 | Ohta et al. | |
| 2002/0012051 A1 | 1/2002 | Mizoguchi | |
| 2005/0146621 A1 | 7/2005 | Tanaka et al. | |

FOREIGN PATENT DOCUMENTS

| | | |
|---|---|---|
| EP | 1453055 A | 9/2004 |
| JP | 06-133193 A | 5/1994 |
| JP | 2000-041207 A | 2/2000 |
| JP | 2001-045500 A | 2/2001 |
| JP | 2001-218077 A | 8/2001 |
| JP | 2002-232766 A | 8/2002 |
| JP | 2003-18442 A | 1/2003 |

* cited by examiner

*Primary Examiner* — Usman Khan
(74) *Attorney, Agent, or Firm* — Cowan, Liebowitz & Latman, P.C.

(57) ABSTRACT

A camera which can accurately inform a photographer of the number of times image taking is possible is disclosed. The camera comprises an image-pickup device which photoelectrically converts an object image to an electric signal, an image processing circuit which applies image processing to the image data obtained by using the image-pickup device and generates processed image data, a recording circuit which records the processed image data in a recording medium, a control circuit which causes the image processing circuit to perform image processing on the image data obtained through one-time image taking under a plurality of different conditions to generate a plurality of the processed image data, and an information output unit which outputs information on the remaining number of times image taking is possible.

10 Claims, 5 Drawing Sheets

NO WB-BKT SETTING

WITH WB-BKT SETTING

DISPLAY CONTROL APPARATUS

CROSS-REFERENCE TO RELATED APPLICATIONS

This application is a divisional of application Ser. No. 10/785,857, filed Feb. 24, 2004, now U.S. Pat. No. 7,463,288 the entire disclosure of which is hereby incorporated by reference.

BACKGROUND OF THE INVENTION

1. Field of the Invention

The present invention relates to a camera having a bracket image-taking function which for example, generates a plurality of images while changing image processing conditions for an image obtained through a single image-taking operation, and more particularly, to a camera capable of measuring and displaying the remaining image-taking count when the bracket image-taking function is set.

2. Description of the Related Art

In recent years, a so-called electronic camera is becoming widespread which photoelectrically converts an object image formed by an image-taking optical system to an electric signal by means of a solid image-pickup device, for example, a CCD two-dimensional image sensor and records image data obtained in a recording medium such as a semiconductor memory and magnetic disk.

Many electronic cameras of this type have an auto function which automatically controls exposure, focusing and color processing according to the image-taking situation at the time of image taking. There is a camera with an auto bracket image-taking function which automatically and gradually changes color processing and exposure control and takes a plurality of images successively so as to obtain an image intended by a photographer or a camera with a bracket image-taking function which takes a image and then generates a plurality of images by automatically and gradually changing development processing from exposure onward, for example, only color processing.

On the other hand, a camera disclosed in Japanese Patent Application Laid-Open No. H6 (1994)-133193, No. 2000-41207 and No. 2003-18442, calculates the capacity of a recording medium and displays the number of remaining images that can be taken on a display panel.

Conventionally, one image data is generated through one image-taking operation, and therefore the number of remaining images which is displayed is the same as the number of times image taking is possible. However, when a plurality of image data are generated through one-time image taking and these image data are recorded in a recording medium, even if there remain a sufficient number of remaining images that can be taken, a plurality of image data are automatically generated through bracket image taking, thus exceeding the capacity of the recording medium against the intention of the photographer and making it impossible to continue image taking.

SUMMARY OF THE INVENTION

It is an object of the present invention to provide a camera which informs the photographer of the number of image data that can be recorded in a recording medium and the number of times image taking is possible in an easy-to-see manner and thereby represses failures to record the image data in the recording medium against the intention of the photographer.

One aspect of the camera of the present invention comprises an image-pickup device which photoelectrically converts an object image to an electric signal, an image processing circuit which applies image processing to the image data obtained by using the image-pickup device and generates processed image data, a recording circuit which records the processed image data in a recording medium, a control circuit which causes the image processing circuit to perform image processing on the image data obtained through one-time image taking under a plurality of different conditions to generate a plurality of the processed image data, and an information output unit which outputs information on the remaining number of times image taking is possible.

Here, the control circuit calculates the remaining number of times based on the remaining capacity of the recording medium and a predicted amount of the plurality of processed image data and causes the information output unit to output information on the calculated remaining number of times.

Another aspect of the camera of the present invention comprises an image-pickup device which photoelectrically converts an object image to an electric signal, an image processing circuit which applies image processing to the image data obtained by using the image-pickup device and generates processed image data, a recording circuit which records the processed image data in a recording medium, a control circuit which causes the image processing circuit to perform image processing on the image data obtained through one-time image taking under a plurality of different conditions to generate a plurality of the processed image data, and an information output unit which outputs information on the remaining number of times image taking is possible.

Here, the control circuit calculates the remaining number of times based on the remaining capacity of the recording medium, a predicted amount of one of the plurality of processed image data and a number of the processed image data generated by one-time image taking, and causes the information output unit to output information on the calculated remaining number of times.

The features of the camera of the present invention will become more apparent from the following detailed description of a preferred embodiment of the invention with reference to the drawings.

DETAILED DESCRIPTION OF THE PREFERRED EMBODIMENTS

With reference now to the attached drawings, a camera (electronic still camera) which is an embodiment of the present invention will be explained in detail below.

Figure 1:
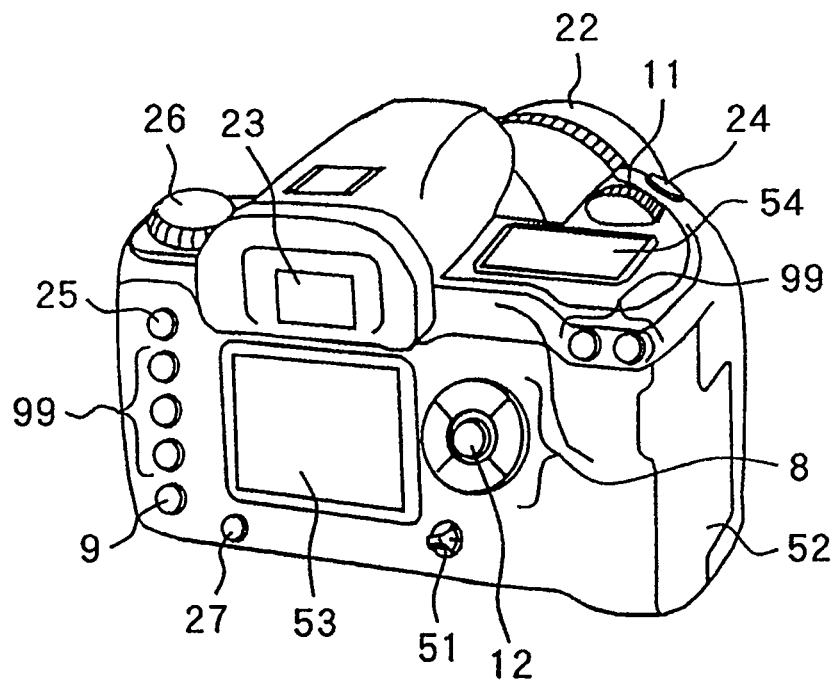
FIG. 1 is an external perspective view of a camera according to an embodiment of the present invention.

FIG. 1 is an external perspective view of a camera according to an embodiment of the present invention. As shown in FIG. 1, the electronic camera (camera system) which is this embodiment has a camera 21 and a lens apparatus 22 which is attachable/detachable to/from the camera 21.

When the lens apparatus 22 is mounted on the camera 21, the lens apparatus 22 can communicate with the camera 21. The lens apparatus 22 is provided with an AF/MF changeover switch (not shown), which allows switching between auto focusing and manual focusing.

An object light flux incident from the lens apparatus 22 is guided to an optical view finder 23 provided inside the camera 21, which allows the photographer to observe the object image through the optical view finder 23.

The camera 21 is provided with a release button 24, a menu button 25, an image-taking mode dial 26, an erase button 27, a cross-key button 8, a playback button 9, an electronic dial 11, a SET button 12, a main switch 51 and other buttons 99 as operation members.

Furthermore, a color liquid crystal display 53 which displays an image taken and image-taking information, etc., is provided on the back of the camera 21 and a top liquid crystal display 54 which displays image-taking information is provided on the top of the camera 21. Inside the camera 21, there is a housing chamber for housing a recording medium and a covering member 52 which covers the opening of the housing chamber is provided close thereto.

When an image is taken, after the main switch 51 is operated to start the camera, a desired image-taking mode is set by operating the image-taking mode dial 26. Here, when a Shutter Speed-priority AE (automatic exposure) mode is set as an image-taking mode and when a shutter speed (Tv value), etc., needs to be set, it is possible to set the Tv value by operating the electronic dial 11 while seeing the value displayed on the top liquid crystal display 54.

The release button 24 allows a 2-stage depression operation; an image-taking preparation operation (photometric operation or focusing operation, etc.) is started when half depressed and an image-taking operation (exposure to light on an image-pickup device provided in the camera 21) when fully depressed. When the exposure operation is completed, the data read from the image-pickup device is subjected to predetermined processing and written in the recording medium.

When the playback button 9 is depressed, the image data of the image taken is displayed on the color liquid crystal display 53. When a right/left button of the cross-key button 8 is depressed while the image data is displayed, other image data can be displayed. When the erase button 27 is depressed while the image data is displayed on the color liquid crystal display 53, the image data displayed can be erased.

With regard to the setting of the camera, there are a type of setting in which the setting button (one of the buttons 99) is depressed to enter a setting mode and the electronic dial 11 is operated while seeing the display on the top liquid crystal display 54 and another type of setting in which the menu button 25 is depressed and the cross-key button 8 is operated while seeing the menu display shown on the color liquid crystal display 53 to select a menu and the SET button 12 is operated to make a setting in the menu.

Figure 2:
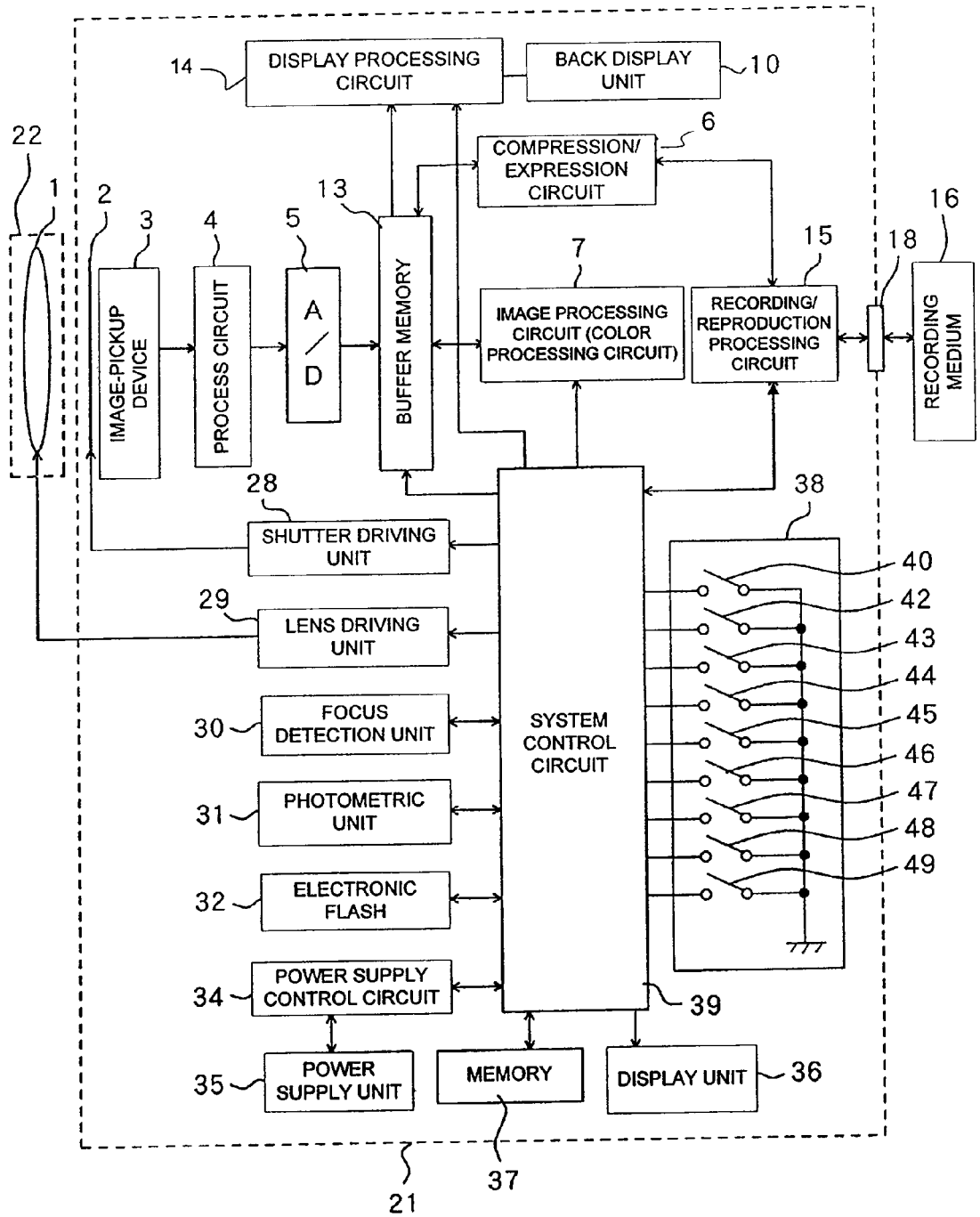
FIG. 2 is block diagram showing an internal configuration of the camera which is this embodiment.

FIG. 2 is a block diagram showing an internal configuration of the camera according to this embodiment.

In FIG. 2, reference numeral 1 denotes an image-taking lens provided in the lens apparatus 22 and 2 denotes a shutter having light-blocking blades which are movable (inserted or withdrawn) with respect to the image-taking optical path. FIG. 2 shows one image-taking lens but a plurality of image-taking lenses are actually provided in the lens apparatus 22. Reference numeral 3 denotes an image-pickup device such as a CCD, etc., which receives an object light flux incident from the image-taking lens 1 and photoelectrically converts the optical image to an electric signal.

Reference numeral 4 denotes a process circuit which carries out publicly known camera signal processing such as gamma correction on the signal output from the image-pickup device 3 and 5 denotes an A/D converter which converts the analog signal output from the process circuit 4 to a digital signal.

Reference numeral 13 denotes a buffer memory such as DRAM, which temporarily stores the digital signal which has been A/D-converted by the A/D converter 5. Reference numeral 7 denotes an image processing circuit (color processing circuit), which carries out auto white balance, starting, color signal generation or other color processing on the pixel signal read from the buffer memory 13.

The color image signal (processed image data) generated by the image processing circuit 7 is stored in the buffer memory 13 again.

Reference numeral 14 denotes a display processing circuit, which carries out processing for displaying the color image signal subjected to image processing by the image processing circuit 7 and stored in the buffer memory 13 again on a back display unit 10 which will be described later as a color image. Reference numeral 10 denotes a back display unit (corresponds to the color liquid crystal display 53 in FIG. 1), which receives the color image signal processed by the display processing circuit 14 and displays a color image.

Reference numeral 6 denotes a compression/expansion circuit, which compresses the color image signal subjected to image processing by the image processing circuit 7 and stored in the buffer memory 13 again or expands the compressed color image signal as will be described later.

Reference numeral 15 denotes a recording/reproduction processing circuit (recording circuit) which records the color image signal subjected to compression processing by the compression/expansion circuit 6. Reference numeral 18 denotes a connector provided in the camera 21, which electrically connects a recording medium 16 such as a memory card and the camera 21.

As the recording medium 16, a memory card made up of a semiconductor memory such as card type flash memory is generally used, but it is not limited to the memory card and any medium in various modes, for example, a magnetic recording medium such as a hard disk and floppy disk can also be used.

When image data recorded in the recording medium 16 is reproduced, the image data is subjected to reproduction processing by the recording/reproduction processing circuit 15 through the connector 18, subjected to expansion processing by the compression/expansion circuit 6 and then temporarily stored in the buffer memory 13. Then, the image data stored in the buffer memory 13 is processed by the display processing circuit 14 in the same way as when an image is taken and the image data is displayed (reproduced) on the back display unit 10.

Reference numeral 39 denotes a system control circuit, which receives an signal from a switch unit 38, carries out operation according to the signal, detects the type of the recording medium 16 housed in the camera 21 or state of the recording medium 16 (remaining storage capacity, etc.) or controls the operation of the camera according to a signal output from a detection unit (focus detection unit 30 or photometric unit 31, etc.) of the camera 21 as will be described later.

Reference numeral 28 denotes a shutter driving unit, which drives the shutter 2 in response to a command from the system control circuit 39. When the shutter 2 is driven, the light-blocking blades enter or withdraw from the image-taking optical path to thereby control exposure.

Reference numeral 29 denotes a lens driving unit, which drives the focusing lens of the image-taking lens 1 in response to a command from the system control circuit 39. Focusing operation is carried out through the driving of the focusing lens.

Reference numeral 30 denotes a focus detection unit, which detects the focusing state of the image-taking optical system in response to a command from the system control circuit 39 and sends the detection result to the system control circuit 39. The system control circuit 39 controls the driving of the focusing lens according to the focusing state of the image-taking optical system.

Reference numeral 31 denotes a photometric unit, which measures (photometry) brightness of an object in response to a command from the system control circuit 39 and sends the photometric result to the system control circuit 39. The system control circuit 39 determines an exposure value based on the photometric result. Reference numeral 32 denotes an electronic flash, which irradiates the object with illumination light in response to a command from the system control circuit 39.

Reference numeral 34 denotes a power supply control circuit, which detects and controls the state of a power supply unit 35 which will be described later. Reference numeral 35 denotes a power supply unit, which has a battery, a DC-DC converter and a switch for switching between blocks to be powered, and controlled by the power supply control circuit 34.

Furthermore, the power supply control circuit 34 detects the presence/absence of a battery, type of the battery and remaining amount of the battery and controls the power supply unit 35 based on the detection result and command from the system control circuit 39.

Reference numeral 36 denotes a display unit (corresponds to the top liquid crystal display 54 in FIG. 1, information output unit), which displays the operating state (number of images taken, etc.) of the camera in response to a command from the system control circuit 39. Reference numeral 37 denotes a control memory which stores constants and variables, etc., for operations of the system control circuit 39.

Reference numeral 38 denotes a switch unit, which outputs a command (signal) which causes the system control circuit 39 to perform various operations. The switch unit 38 includes switches which will be explained below.

The ON/OFF state of a main switch 40 is switched according to the operation of the main switch 51 and when the main switch 40 is ON, the camera is started. A switch (SW1) 42 is turned ON when the release button 24 is half depressed and outputs a command for starting a focus detection operation by the focus detection unit 30 and a photometric operation by the photometric unit 31.

A switch (SW2) 43 is turned ON when the release button 24 is fully depressed and outputs a command for starting an exposure operation by driving the shutter 2. When a menu switch 44 is turned ON, the menu switch 44 outputs a command for displaying a setting menu of the camera to the color liquid crystal display 53.

A switch 45 practically has a plurality of switches which are turned ON when the right, left, up and down buttons of the cross-key buttons 8 (indicated by one switch in FIG. 2) are each depressed, and outputs command relating to the menu switching direction according to the switch which is turned ON.

When a setting switch 46 is turned ON, the setting switch 46 outputs a command for making a setting in a menu selected through an operation of the cross-key buttons 8.

An erase switch 47 is turned ON through a depression of the erase button 27 and outputs a command for erasing image data of an image taken. Through the operation of the erase button 27, it is possible to indicate unnecessary image data from image data of images taken and erase the indicated image data.

A playback switch 48 is turned ON through a depression of the playback button 9 and outputs a command for displaying image data of an image taken on the color liquid crystal display 53. Through the operation of the playback button 9, it is possible to switch between an image-taking mode and playback mode.

In addition to the above described switches, there is a switch 49 which is turned ON/OFF according to the operation of the electronic dial for setting image-taking conditions of the camera.

Though described as one switch in FIG. 2, some switches may be made up of a plurality of switches. Furthermore, there are other switches (not shown) in addition to the above described switches. Those switches (not shown) operate interlocked with the buttons 99, dial, lever, etc.

Figure 4:
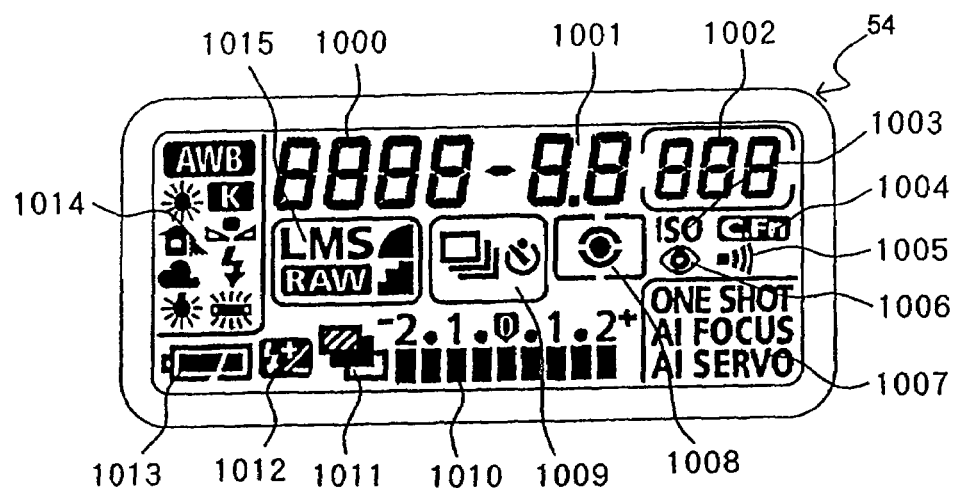
FIG. 4 illustrates a display on a top liquid crystal display of the camera according to this embodiment.

Displays on the top liquid crystal display 54 of the camera according to this embodiment will be explained using FIG. 4.

Reference numeral 1000 denotes a shutter speed display section, which displays not only a shutter speed (Tv value) but also "Busy" indicating that data is being processed, a warning on the backup battery, ISO sensitivity, etc. Reference numeral 1001 denotes a stop value display section, which displays not only a stop value (Av value) but also "CF FULL" (indicating that there is little remaining recording capacity in the CF which is a recording medium), CF error, focus detection area, error code, etc together with the display section 1000.

Reference numeral 1002 denotes a display section of the number of times image taking is possible, which displays the number of times image taking is possible (the number of times normal image taking is possible) corresponding to the number of image data recordable in the recording medium 16 which is actually housed in the camera 21. The "number of times normal image taking is possible" refers to the number of times image taking is possible when one image data is created through one-time image-taking operation.

The display section 1002 displays not only the above described items but also a count down during operation of a self-timer and elapsed time during bulb exposure.

The system control circuit 39 calculates the number of times image taking is possible based on the remaining capacity of the recording medium 16 obtained through the recording/reproduction processing circuit 15 and a predicted amount of the image size stored in the memory 37. The memory 37 stores the predicted amount of the image size corresponding to the size of recorded image data, compression rate and ISO sensitivity respectively.

Here, when white balance bracket (hereinafter referred to as "WB-BKT") is set as the image-taking mode, the display section 1002 displays a count (number of times BKT image taking is possible) obtained by dividing the above described number of times normal image taking is possible by the number of times the image data obtained by one-time image taking is subjected to development processing (number of image data created by one-time exposure).

Reference numeral 1003 denotes an ISO setting mark, which is shown in an ISO setting mode. Reference numerals 1004, 1005 and 1006 denote a custom function mark, an beep mark indicating a beep function, a red-eye mark indicating a red-eye minimizing function, respectively, which is lighted up when their respective functions are set.

Reference numeral 1007 denotes an AF operating mode display section, which displays any one of ONE SHOT, AI FOCUS or AI SERVO when the auto focus mode is set in the lens apparatus 22. When the manual focus mode is set in the lens apparatus 22, this display section 1007 is in a non-display state.

Reference numeral 1008 denotes a photometric mode display section, 1009 denotes a drive & self mode display section, which is in a display state when each mode is set. Reference numeral 1010 denotes an exposure correction display section, which displays an exposure level in a manual image-taking mode, an amount of exposure correction in an AE image-taking mode and an AEB (Auto Exposure Bracketing) level during AEB image taking. Furthermore, the display section 1010 also displays a progress bar during writing in the recording medium 16.

Reference numeral 1011 denotes an AEB mark and 1012 denotes a dimmer correction mark, which are in a display state when an AEB setting and dimmer correction setting are effective. Reference numeral 1013 denotes a battery mark, which displays a power supply state indicating whether the battery is fully-charged or half-charged or blinking when the battery is nearly dead.

Reference numeral 1014 denotes a white balance display section, which has nine marks; auto (AWB), and (counter-clockwise starting from a mark at the lower left of AWB) sunlight, shade, cloud, electric bulb, fluorescent light, electronic flash, manual and color temperature (K). Then, of these marks, the one corresponding to the setting is displayed.

When WB-BKT is set, the indicator changes from an ON state to a blinking state indicating that bracket is set.

Reference numeral 1015 denotes a recording image quality display section, which displays the size of image data L (large), M (middle) and S (small), fine or normal indicating a compression rate of an image, or RAW indicating no compression, etc. When the camera is set to a RAW mode (recording mode), an image signal read from the image-pickup device 3 is not subjected to image processing at the image processing circuit 7 and recorded in the recording medium 16.

Figure 6:
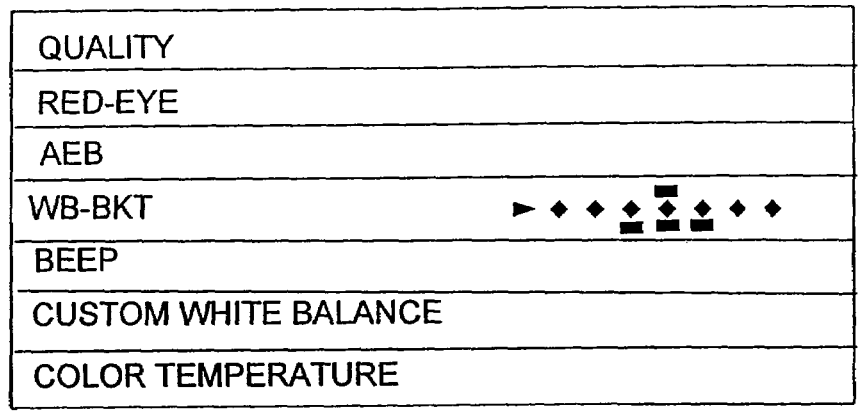
FIG. 6 illustrates a menu screen (white balance bracket setting)

FIG. 6 shows an example of the menu display shown on the color liquid crystal display 53 and indicates the WB-BKT setting state. In FIG. 6, "Quality" is a display related to the setting of recording image quality of image data, "Red-eye" is a display related to the setting of a red-eye minimizing function, "AEB" is a display related to the setting of auto white balance, "WB-BKT" is a display related to the setting of the above described WB-BKT, "Beep" is a display related to the setting of a beep, "Custom white balance" is a display related to the manual setting of white balance and "Color Temperature" is a display related to the setting of a color temperature.

Operating the UP/DOWN button of the cross-key buttons 8 allows "WB-BKT setting" to be selected from among the seven items displayed on the color liquid crystal display 53 and operating the RIGHT/LEFT button of the cross-key buttons 8 in this state allows the amount of bracket to be selected. Then, after the amount of bracket is selected, the setting of WB-BKT is completed by pressing the SET button 12.

When WB-BKT is set, the mark lit in the white balance display section 1014 of the top liquid crystal display 54 blinks to inform the photographer that WB-BKT has been set.

In the camera of this embodiment, the WB-BKT setting allows, as shown in FIG. 6, the color temperature to be changed one step or within a range of ±3 steps with respect to a standard temperature of white balance being set. Then, according to one-time release operation, it is possible to generate (develop) three images by performing the color processing operation while automatically changing the color temperature for the standard color temperature.

Here, the WB-BKT setting steps, setting range, the number of images developed are not limited to the above described settings, but other settings are also acceptable. For example, as choices of the number of times color processing is carried out, it is possible to use an odd number such as 3, 5 or 7, which allows a basic color processing condition to be set as the center. This number of times may be set on the camera side beforehand or may also be changed by operating, for example, the cross-key buttons 8.

Here, one step corresponds to 5 mireds of a color temperature conversion filter. The order of color temperatures for development is normally standard color temperature, minus (red) correction and plus (blue) correction. If the setting in the camera is changed, it is also possible to perform development in order of minus (red) correction, standard color temperature and plus (blue) correction.

Since exposure is performed once during WB-BKT image taking, the order of recording in the recording medium 16 is changed.

The number of times normal image taking is possible and the number of times BKT image taking is possible are equivalent to the number of times the release button 24 can be fully pressed (release). If WB-BKT is set in such a way that three image data are developed through one-time release operation, the number of times BKT image taking is possible is reduced to ⅓ of the number of times normal image taking is possible. Then, the count value of the number of times BKT image taking is possible is decremented by 1 every time the release operation is performed and when the count value reaches 0, "FULL CF" is displayed on the display sections 1000 and 1001.

Conventionally, even if WB-BKT is set, the display of the number of times image taking is possible is not changed, the number of times image taking is possible is decremented by 3 every time a release operation is performed. For this reason, when the remaining number of times image taking is possible falls below 3, the image taking is no longer possible. Then the photographer misjudges that image taking is possible even though image taking is actually not possible or image data cannot be recorded in the recording medium 16 before all the set bracket image taking is completed.

Furthermore, in the case where the number of images to be developed by bracket image taking can be changed, it is hard to understand how many times image taking is further possible. This problem becomes noticeable when a high number such as 5 or 7 is set.

During image taking, how many times image taking is further possible is more important than how many numbers of image data can be further recorded in the recording medium 16, and from this standpoint, the camera of this embodiment always displays the number of times image taking is possible (the number of times normal image taking is possible or the number of times BKT image taking is possible) to allow the photographer to easily understand the number of times the release operation can be performed.

Here, in a case where a plurality of image data are generated by one-time image taking (in the case of bracket image taking), as will be described later, instead of regarding the number of image data that can be recorded in the remaining capacity of the recording medium 16 as the number of times image taking is possible, the number of times image taking is actually possible (the number of times a plurality of image data generated can be recorded in the recording medium) is informed to the photographer as the number of times image taking is possible with consideration given to the fact that a plurality of image data are generated through one-time image taking.

When a plurality of image data are generated by one-time image taking, it is possible to repress the photographer from misjudging the number of times image taking is possible by displaying the number of times image taking is actually possible as described above.

Furthermore, it is possible to inform the photographer of the number of times image taking is actually possible and record all image data generated through an image-taking operation in the recording medium, and thereby avoid the above described problem that some of the plurality of image data cannot be recorded in the recording medium 16.

Figure 7:
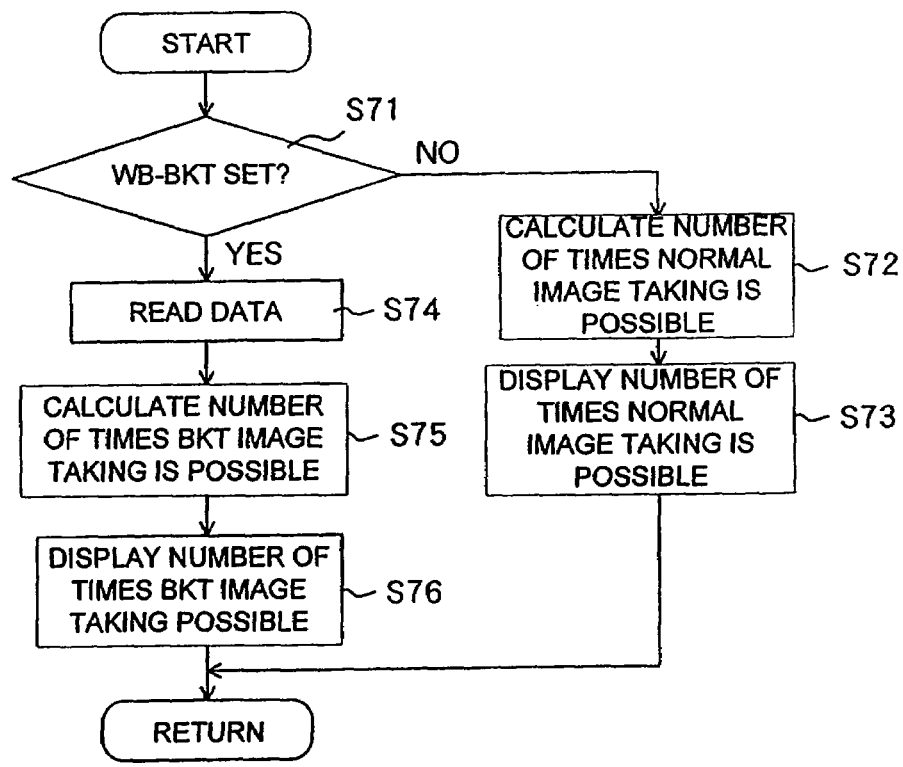
FIG. 7 is a flow chart showing display control of an image-taking count.

FIG. 7 is a flow chart showing a control operation when the number of times image taking is possible is displayed in the camera of this embodiment.

In FIG. 7, the system control circuit 39 decides whether the WB-BKT setting is made or not (step S71), and if the WB-BKT setting is made, the process moves on to step S74 and if the WB-BKT setting is not made, the process moves on to step S72.

Figure 5A:
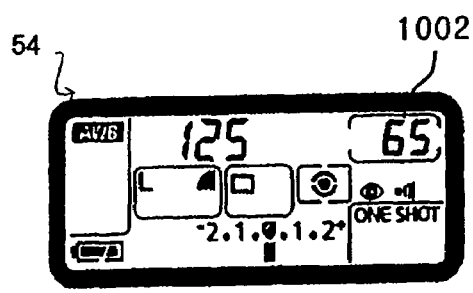
FIG. 5A shows a display on the top liquid crystal display when WB-BKT is not set and FIG. 5B shows a display on the top liquid crystal display when WB-BKT is set.

In step S72, as described above, the number of times normal image taking is possible is calculated based on the remaining capacity of the recording medium 16 and a predicted amount of the image size. In step S73, a control signal is output to the display unit 36 and the number of times normal image taking is possible is thereby displayed on the display section 1002 of the top liquid crystal display 54. The display state of the top liquid crystal display 54 at this time is shown in FIG. 5A. The display section 1002 shows that the number of times image taking is possible is "65."

On the other hand, in step S74, the number of image data generated by one-time release operation is read in the WB-BKT setting. This embodiment assumes that the number of images is three, but when the number of images can be changed, the number of images changed beforehand is read.

In step S75, the number of times normal image taking is possible is calculated as described above and the number of times BKT image taking is possible is calculated based on the calculated number of times normal image taking is possible and the number of image data generated by one-time image taking.

More specifically, the number of times normal image taking is possible divided by the number of image data generated by one-time image taking is the number of times BKT image taking is possible.

Figure 5B:
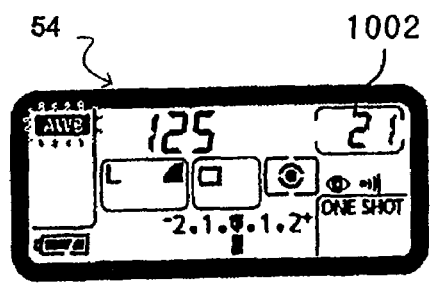

In step S76, the system control circuit 39 outputs a control signal to the display unit 36 and thereby causes the display section 1002 of the top liquid crystal display 54 to display the number of times BKT image taking is possible. The display state of the top liquid crystal display 54 at this time is shown in FIG. 5B.

The display section 1002 shows that the number of times image taking is possible is "21(≈65/3)." That is, it shows that when image taking is performed with WB-BKT set, the release operation can be performed 21 times.

On the other hand, when, for example, the number of times normal image taking is possible is "2", the top liquid crystal display 54 displays "FULL CF" in the WB-BKT setting, informing the photographer that bracket image-taking is not possible. In this case, it is also possible to inform the photographer using not only the display on the top liquid crystal display 54, but also sound or vibration that bracket image taking is not possible.

In the above described flow, when a RAW mode is set, regardless of whether WB-BKT is set or not, the system control circuit 39 calculates the number of times normal image taking is possible based on the remaining capacity of the recording medium 16 and the predicted amount corresponding to the RAW mode of the predicted amount of the image size stored in the memory 37 as described above.

Then, the system control circuit 39 outputs a control signal to the display unit 36 and thereby causes the display section 1002 of the top liquid crystal display 54 to display the number of times normal image taking is possible.

When a non-compressed RAW mode is selected, it is also possible to prohibit any bracket image-taking operation by temporarily suspending the WB-BKT setting even if the release button 24 is operated. That is, the bracket setting is not canceled and it is possible to make the bracket image-taking operation start when the recording image quality is changed from the RAW mode to another mode.

Furthermore, the camera of this embodiment displays the number of times image taking is possible (the number of times normal image taking is possible and the number of times BKT image taking is possible) on the top liquid crystal display 54 to inform it to the photographer. But as another configuration, it is also possible to provide a sound output unit (information output unit) in the camera 21 and use sound output from the sound output unit to inform the number of times image taking is possible.

Then, color processing applied by the image processing circuit (color processing circuit) 7 will be explained.

A pixel signal which is read from the image-pickup device 3, converted to a digital signal by the A/D converter 5 and then temporarily stored in the buffer memory 13 is subjected to first color processing using a white balance coefficient given from the system control circuit 39 first.

Changing the white balance coefficient, for example, R/G (balance of red with respect to green)=0.5→1.5, B/G (balance of blue with respect to green)=1.5→0.5 is equivalent to changing the white balance from low→high color temperature, and it is possible, for example, in terms of the sky, to express colors from a blue sky to sky at sunset.

Furthermore, the above described pixel signal is subjected to second color processing using a matrix coefficient given from the system control circuit 39. When the matrix coefficient (3×3) is changed, it is possible to change, for example, expression of the color of the skin from red to yellow.

Furthermore, the above described pixel signal is subjected to third color processing using a color-difference coefficient given from the system control circuit 39. When the color-difference coefficient is changed, as in the case of the change of the matrix coefficient in the second color processing, it is possible to change, for example, expression of the color of the skin from red to yellow.

When image taking is carried out in the bracket image-taking mode, the system control circuit 39 controls the operation of the image processing circuit (color processing circuit) 7 so as to apply color processing a plurality of times to a pixel signal which is read from the image-pickup device 3, converted to a digital signal by the A/D converter 5 and then temporarily stored in the buffer memory 13 while varying at least one of the white balance coefficient, matrix coefficient and color-difference coefficient.

Figure 3:
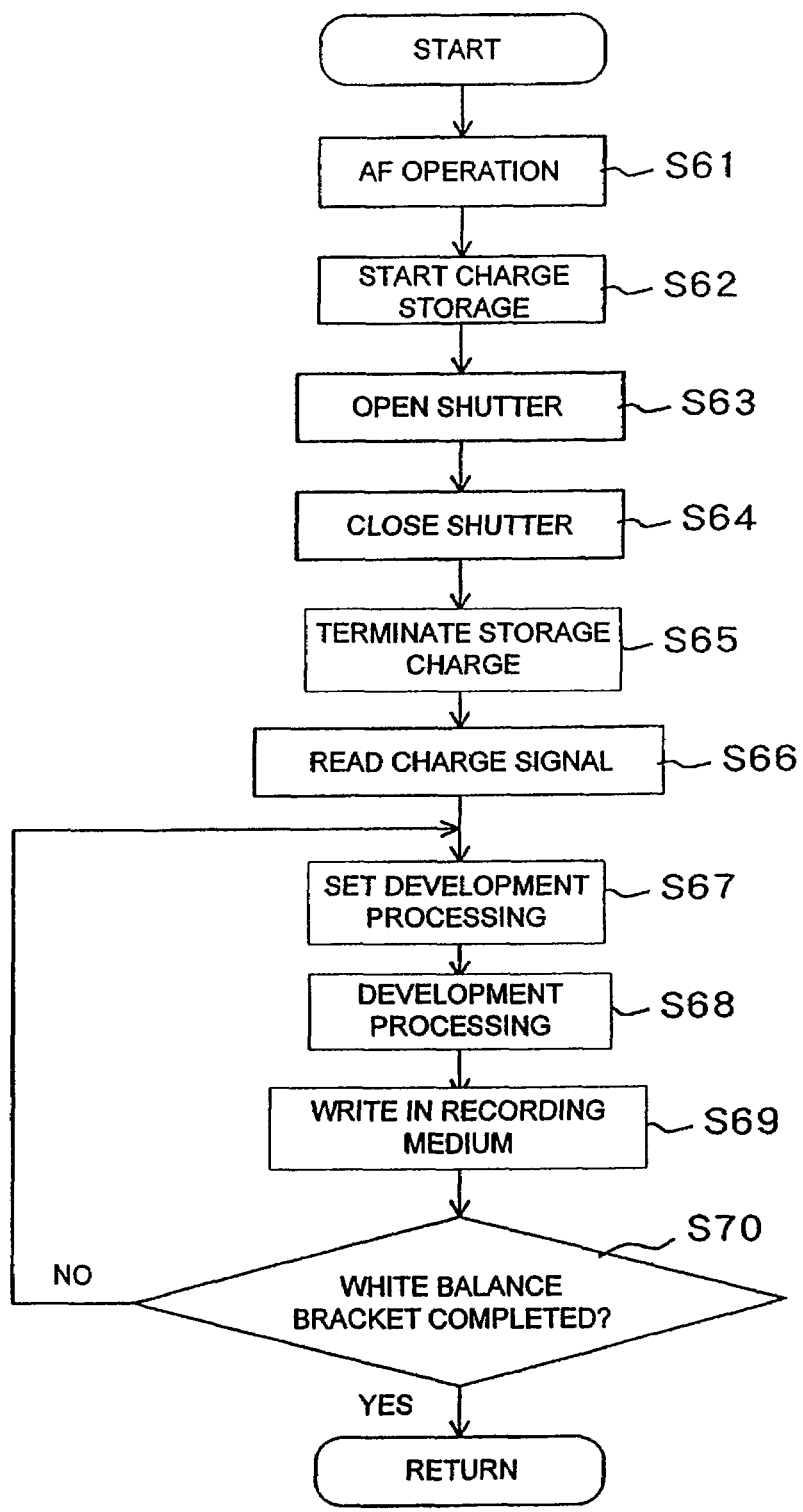
FIG. 3 is a flow chart illustrating the procedure for a bracket image-taking operation of the camera according to this embodiment.

This embodiment relates to a white balance bracket which carries out color processing a plurality of times while varying the white balance coefficient, and the procedure for a bracket image-taking operation of the camera according to this embodiment will be explained with reference to the flow chart shown in FIG. 3. This operation is controlled by the system control circuit 39.

In carrying out an image-taking operation, suppose the settings of the image-taking mode and white balance bracket, etc., of the camera are already set beforehand. As described above, the focusing operation and photometric operation are carried out with the release button 24 half depressed, while the shutter driving and exposure operation are carried out with the release button 24 fully depressed, and in the following explanations, it is assumed that those operations are carried out sequentially.

The system control circuit 39 drives the focusing lens of the image-taking lens 1 through the lens driving unit 29 based on the focusing state of the image-taking optical system obtained by driving the focus detection unit 30. Therefore, the image-taking optical system is in focus state. At the same time, the system control circuit 39 saves photometric data obtained by driving the photometric unit 31 at a predetermined address in the memory 37. (Step S61).

Then, the system control circuit 39 calculates the shutter speed and stop value to be subjected to exposure control based on the photometric data saved in the memory 37 and leaves open the shutter 2 through the shutter driving unit 28 according to the calculated stop value and causes the image-pickup device 3 to expose to light. At this time, after charge storage by the image-pickup device 3 is started beforehand, the shutter 2 is left open (steps S62 and S63).

Since the shutter 2 controls the exposure time in this embodiment, start of charge storage of the image-pickup device 3 (step S62)→open state of the shutter 2 (step S63)→closed state of the shutter 2 (step S64)→end of charge storage of the image-pickup device 3 (step S65) are performed in this order. But in the case where exposure control is performed through start/end of charge storage of the image-pickup device 3, open state of the shutter 2→start of charge storage of the image-pickup device 3→end of charge storage of the image-pickup device 3→closed state of the shutter 2 may also be performed in this order.

After closing the shutter 2 (step S64), charge storage by the image-pickup device 3 is terminated (end of exposure) (step S65), the charge signal stored by the image-pickup device 3 is read, image data is written in the buffer memory 13 through the process circuit 4 and A/D converter 5 (step S66).

A setting for applying first color processing using a standard white balance coefficient given from the system control circuit 39 to the pixel signal temporarily stored in the buffer memory 13 is performed (step S67) first. If the order of the color processing in WB-BKT mode has been changed, the operation of the image processing circuit (color processing circuit) 7 is controlled according to the setting of the development processing of the first image (value changed from the standard value) instead of the standard set value.

In this way, first color processing (development processing) is applied to the image signal stored in the buffer memory 13 (step S68).

The image data generated through the image processing and color processing is compressed by the compression/expansion circuit 6 and then recorded in the recording medium 16 through the recording/reproduction processing circuit 15 (step S69).

Then, it is decided whether the WB-BKT processing operation has been terminated or not (step S70). Here, when the WB-BKT has not been set or when all the WB-BKT processing operation has been completed, this processing is terminated. When there still remains any part of the WB-BKT development processing, the process returns to step S67 so as to perform development processing again.

When the process is returned to step S67, a white balance coefficient which is different from the standard set value is set according to the WB-BKT setting content. Here, changing the white balance coefficient, for example, from R/G (balance of red with respect to green)=0.5→1.5, B/G (balance of blue with respect to green)=1.5→0.5 is equivalent to changing the white balance from low→high color temperature and thereby it is possible, for example, in terms of the sky, to express colors from a blue sky to sky at sunset.

Step S67, step S68 and step S69 are repeated until all the development processing operation in WB-BKT (three development in this embodiment) are completed, and when all the development processing operation are completed, the process is returned to the main control routine (not shown) of the camera.

This embodiment has described the case of the white balance bracket image-taking, but the present invention is applicable to any case where a plurality of image data (processed image data) are generated through a single release operation. For example, the present invention is applicable to a case where a plurality of image data whose exposure are different from one another are generated by applying different types of processing to the data read from the image-pickup device 3.

Furthermore, this embodiment has described the case where the present invention is applied to the camera system having the lens apparatus 22 and camera 21, but the present invention is also applicable to a lens-integrated camera.

While preferred embodiment has been described, it is to be understood that modification and variation of the present invention may be made without departing from scope of the following claims.

What is claimed is:

1. A display control apparatus comprising:
   a receiving unit configured to receive an image-taking instruction from a release button;
   a control unit configured to generate image data using output signal of an image-pickup device in accordance with the image-taking instruction received by the receiving unit and record the image data in a recording medium;
   a setting unit configured to set an ordinary mode in which single image data is generated in accordance with one time image-taking instruction by once operating the release button and a bracket mode in which a plurality of image data are generated in accordance with one time image-taking instruction by once operating the release button, the number of image data generated in the bracket mode being a predetermined number;
   a detecting unit configured to detect remaining capacity of the recording medium;
   a predicting unit configured to predict data amount of single image data;
   a first calculating unit configured to calculate remaining number of image data to be recorded in the recording medium based on the remaining capacity of the recording medium and the predicted data amount of single image data;
   a second calculating unit configured to calculate remaining number of the image-taking instructions to be received by the receiving unit based on the remaining capacity of the recording medium, the predicted data amount of single image data, and the predetermined number of image data;
   a display control unit configured to control so as to display the remaining number of image data when the ordinary mode is set and display the remaining number of the image-taking instructions when the bracket mode is set,
   wherein in the bracket mode, the remaining number of image-taking instructions corresponds to a remaining number of single operations of the release button to generate the predetermined number of image data.

2. The display control apparatus according to claim 1, further comprising the image-pickup device which photo-electrically converts an object image to an electric signal and outputs the electric signal to the control unit.

3. The display control apparatus according to claim 1, further comprising a recording format setting section which is adapted to set a recording format of the image data to be recorded in the recording medium,
wherein, when the recording format is set to a format indicating no compression of image data, the display unit displays the remaining number of image data even when the bracket mode is set.

4. The display control apparatus according to claim 1, wherein the bracket mode is a white balance bracket mode in which a plurality of image data with different color temperatures are generated through one time image-taking operation.

5. The display control apparatus according to claim 1, wherein the plurality of image data generated in the bracket mode represent same object image.

6. A display control method comprising:
a receiving step of receiving an image-taking instruction from a release button;
a control step of (a) generating image data using output signal of an image-pickup device in accordance with the image-taking instruction received at the receiving step and (b) recording the image data in a recording medium;
a setting step of setting an ordinary mode in which single image data is generated in accordance with one time image-taking instruction by once operating the release button and a bracket mode in which a plurality of image data are generated in accordance with one time image-taking instruction by once operating the release button, the number of image data generated in the bracket mode being a predetermined number;
a detecting step of detecting remaining capacity of the recording medium;
a predicting step of predicting data amount of single image data;
a first calculating step of calculating remaining number of image data to be recorded in the recording medium based on the remaining capacity of the recording medium and the predicted data amount of single image data;
a second calculating step of calculating remaining number of the image-taking instructions to be received at the receiving step based on the remaining capacity of the recording medium, the predicted data amount of single image data and the predetermined number of image data;
a display control step of controlling so as to display the remaining number of image data when the ordinary mode is set and display the remaining number of the image-taking instructions when the bracket mode is set,
wherein in the bracket mode, the remaining number of image-taking instructions corresponds to a remaining number of single operations of the release button to generate the predetermined number of image data.

7. The display control method according to claim 6, wherein, in the control step, the image-pickup device photo-electrically converts an object image to an electric signal that is used for generating the image data.

8. The display control method according to claim 6, further comprising a recording format setting step of setting a recording format of the image data to be recorded in the recording medium,
wherein, in the display control step, when the recording format is set to a format indicating no compression of image data, the remaining number of image data is displayed even when the bracket mode is set.

9. The display control method according to claim 6, wherein the bracket mode is a white balance bracket mode in which a plurality of image data with different color temperatures are generated through one time image-taking operation.

10. The display control method according to claim 6, wherein the plurality of image data generated in the bracket mode represent same object image.

* * * * *